May 9, 1961 P. G. McKINLEY 2,983,289
TABLE SAW FOR CUTTING TRUSS MEMBERS
Filed Jan. 26, 1959 4 Sheets-Sheet 1

INVENTOR
PAUL G. McKINLEY
BY Beale & Jones
ATTORNEYS

May 9, 1961  P. G. McKINLEY  2,983,289
TABLE SAW FOR CUTTING TRUSS MEMBERS
Filed Jan. 26, 1959  4 Sheets-Sheet 3

INVENTOR
PAUL G. McKINLEY

BY Beale & Jones
ATTORNEYS

May 9, 1961 P. G. McKINLEY 2,983,289
TABLE SAW FOR CUTTING TRUSS MEMBERS
Filed Jan. 26, 1959 4 Sheets-Sheet 4
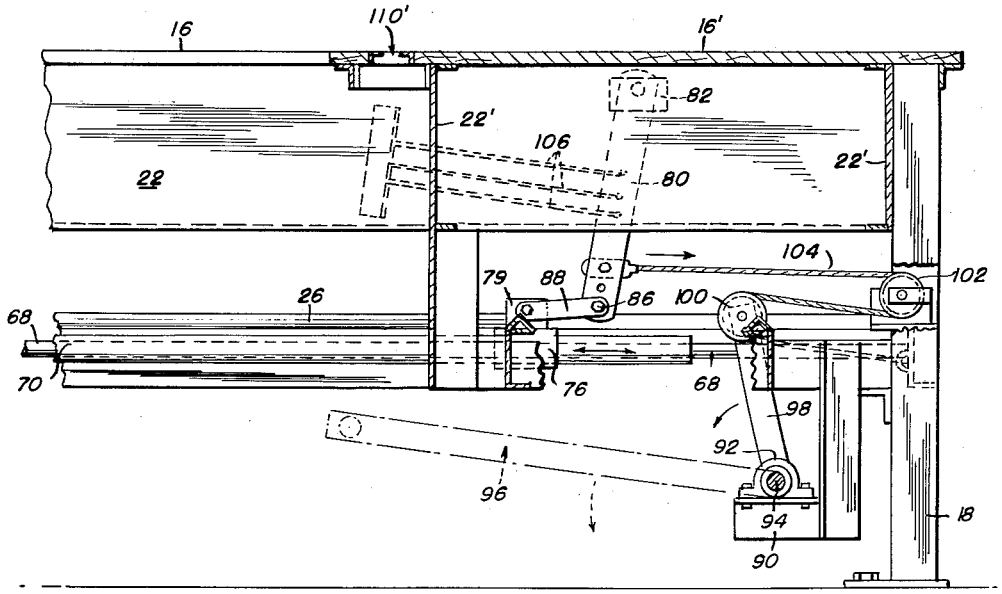
FIG.7
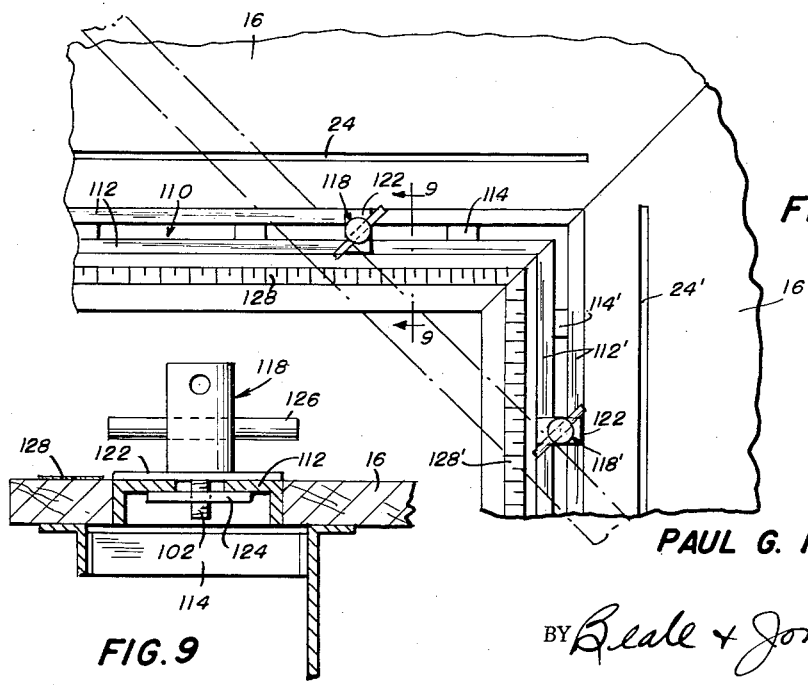
FIG.8
FIG.9
INVENTOR
PAUL G. McKINLEY
BY Beale + Jones
ATTORNEYS United States Patent Office 2,983,289
Patented May 9, 1961

2,983,289

TABLE SAW FOR CUTTING TRUSS MEMBERS

Paul G. McKinley, Coral Gables, Fla., assignor to Pagebar, Inc., Miami, Fla., a corporation of Florida Filed Jan. 26, 1959, Ser. No. 789,181

4 Claims. (Cl. 143—47)

This invention relates to a table saw for cutting truss members. More specifically this invention relates to a table saw comprising two table sections disposed perpendicular to each other and each having movable saw units therein. The saw units are designed to move in paths perpendicular to each other so that in their travel they may make mutually perpendicular cuts on a single piece of stock.

In the formation of a roof truss, it is often necessary to make mutually perpendicular cuts in the opposite ends of a piece of stock. This is especially true in the formation of web members, which in a truss connect the lower chord member with an upper chord member. With saw tables of the prior art, the formation of one such truss member has required setting the miter guide for a first end cut, making the first cut, turning the stock, resetting the miter guide for the second cut, and making the second cut. Even after this multi-stepped procedure, there is no assurance that the end cuts of the member are precisely perpendicular. An error in computation or in the setting of the miter guide, for instance, could introduce discrepancies.

The object of this invention therefore is to provide a table saw including perpendicularly disposed saw units capable of simultaneously making mutually perpendicular cuts in the opposite ends of a piece of stock, thus obviating a multistepped procedure and eliminating to a large extent the possibility of error.

It is a further object of this invention to provide a table saw for forming truss members, said table saw including two movable saw units, one of which has novel and effective foot-operable means for effecting its travel.

This invention embodies other novel features, details of construction and arrangement of parts which are hereinafter set forth in the specification and claims, and illustrated in the accompanying drawings, wherein:

Fig. 7 is a fragmentary elevational view taken on the line 7—7 of Fig. 1;

Fig. 8 is an enlarged fragmentary plan view showing the guiding and holding means on the top of a table embodying the invention; and Fig. 9 is a fragmentary enlarged sectional view taken on the line 9—9 of Fig. 8.

Briefly, the invention is an L-shaped table saw comprising a flat working surface having two slots therein, the slots being perpendicular to each other. Mounted under the working surface are a pair of circular saw units movable in the direction of the said slots respectively. Portions of the blades of the saw units extend up through the slots respectively, whereby the saw units may simultaneously perform opposite end cuts on a piece of stock lying across the working surface, the cuts being mutually perpendicular. Hand-operated means are provided to move each of the saw units, while a foot-operated means is provided for one of them.

Figure 1:
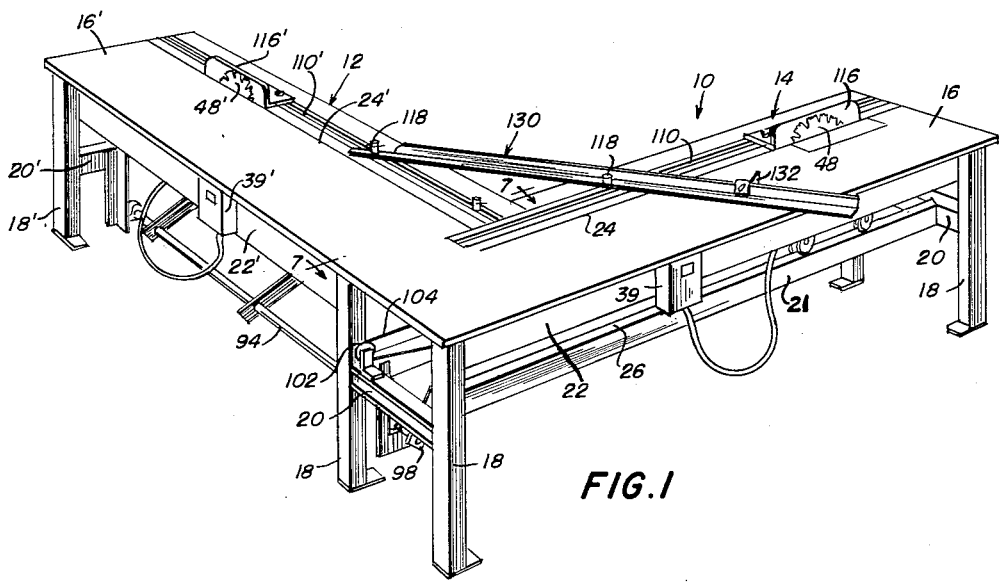
Fig. 1 is a perspective view of an embodiment of the invention taken from the rear.
Figure 2:
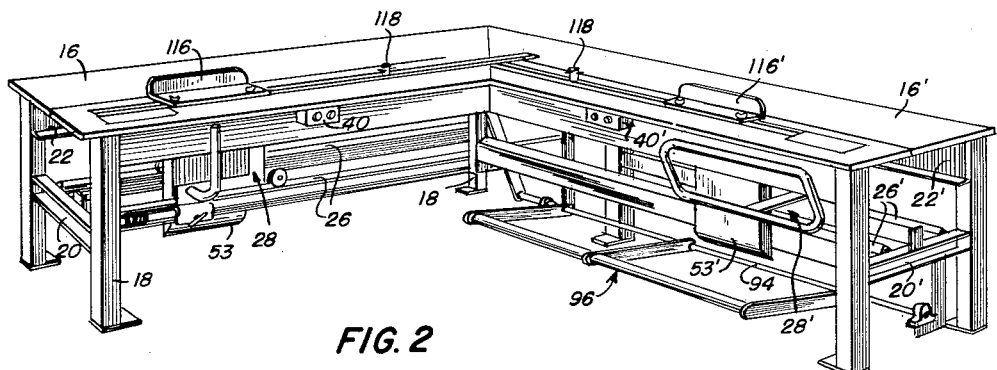
Fig. 2 is a perspective view of an embodiment of the invention taken from the front.

Referring more specifically to the drawings, an embodiment of the invention is broadly designated 10 in Fig. 1. It is an L-shaped table comprising a right-hand section 12 and a left-hand section 14. Since the sections are similar, in the drawings parts of the right-hand section are designated by the primed form of the numeral of the corresponding parts of the left-hand section. Each section has a top 16 of plywood or the like supported by sturdy legs 18 having appropriate crossbraces 20. The support means for the working surface may include for each section a pair of opposed channel members 22 welded or otherwise secured to the top of the sturdy legs. The top of each section of the L-shaped table has a slot 24 extending therealong the lengthwise direction of the section. Under each section top as shown in Fig. 2, a pair of spaced inverted V-shaped rails 26 are fixedly supported on horizontal beams 21 running between the crossbraces 20 or other suitable members. The rails extend in a direction parallel to the slot in the tops of the respective sections.

Figure 4:
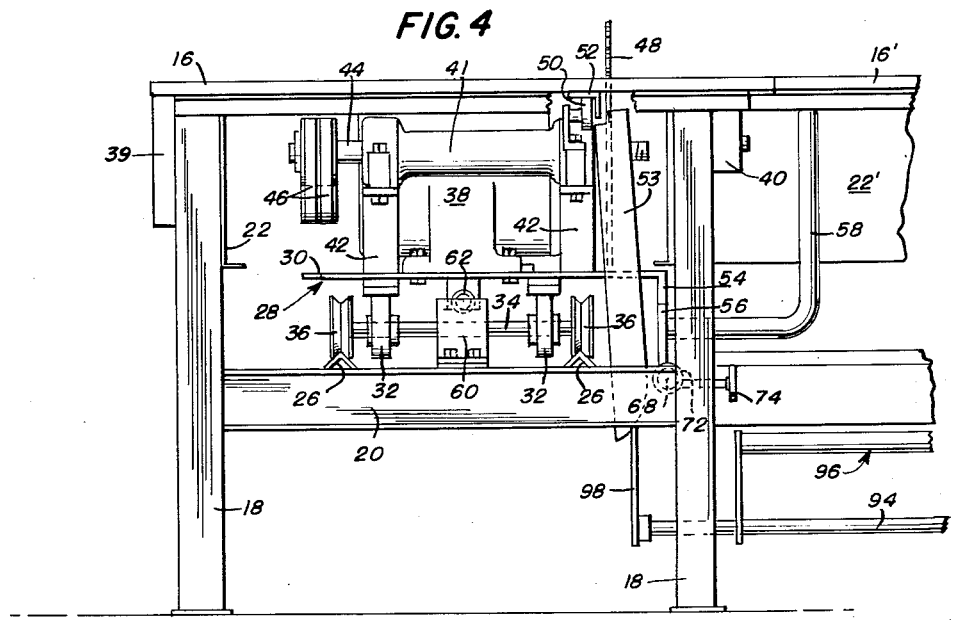
Fig. 4 is an elevational view from the left end of the left-hand section of an embodiment of the invention.
Figure 5:
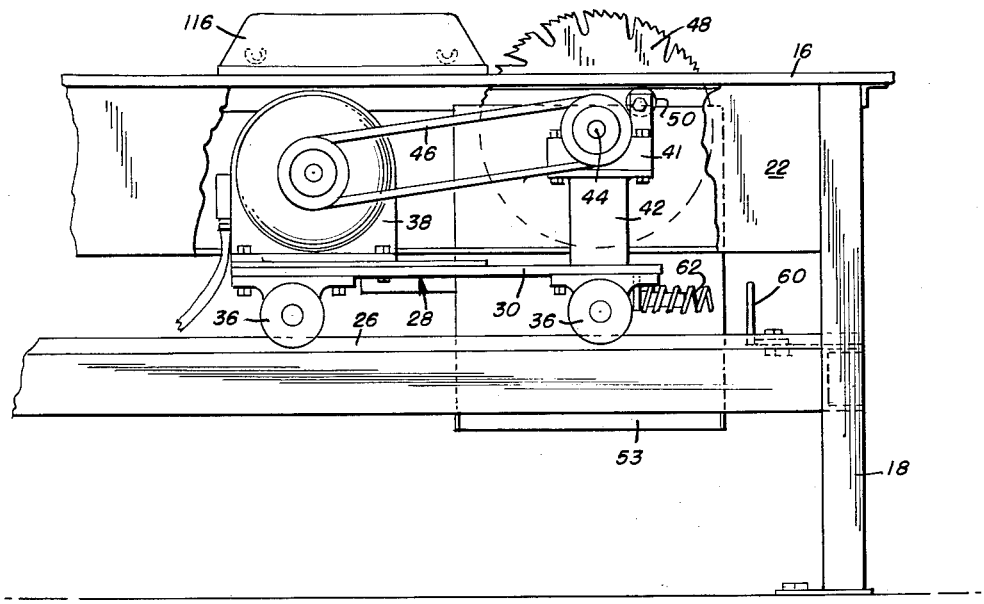
Fig. 5 is an elevational view from the rear of the left-hand section of an embodiment of the invention.

Under each of the sections of the table saw, carriages 28 ride on the inverted V-shaped rails 26. Figs. 4 and 5 show that the carriage for the left-hand section includes a heavy plate 30 or frame under which are mounted two pairs of bearings 32. Each pair is transversely aligned with respect to the rails and journals an axle 34, the outer ends of which mount grooved wheels 36. The grooved wheels rollingly engage the inverted V-shaped rails and roll on them as indicated clearly on Fig. 4. The provision of the grooved wheels and the inverted V-shaped rails allow for the accurate straight line movement of the carriage with no play or lateral movement.

At one end, the carriage plate 30 or frame fixedly mounts an electric motor 38 of desired capacity. The motor is connected through a flexible cable to a connection box 39 mounted on the rear of the section. From thence it is connected through a switch box 40 on the front of the table to a suitable power source. The opposite end of the frame carries a shaft housing 41 suitably supported on spaced elements 42 thereabove. The housing includes two transversely aligned bearings in which rotates a saw shaft 44. Rotatably associating the motor shaft and the saw shaft are a pair of aligned double-grooved pulleys training two belts 46 as shown in Fig. 4. To the opposite end of the saw shaft from the pulley is bolted a circular saw blade 48, a portion of which extends up through the slot 24 in the working surface of the table.

The top of the shaft housing 41 at one end mounts a hold-down wheel 50 which rolls along an angle strip 52 secured along the slot to the underside of the table top. The hold-down wheel serves to prevent upward movement of the saw carriage which might result in its displacement from its tracks. Adjacent the housing 41, a saw dust guard 53 or collector is secured to the frame.

Figure 6:
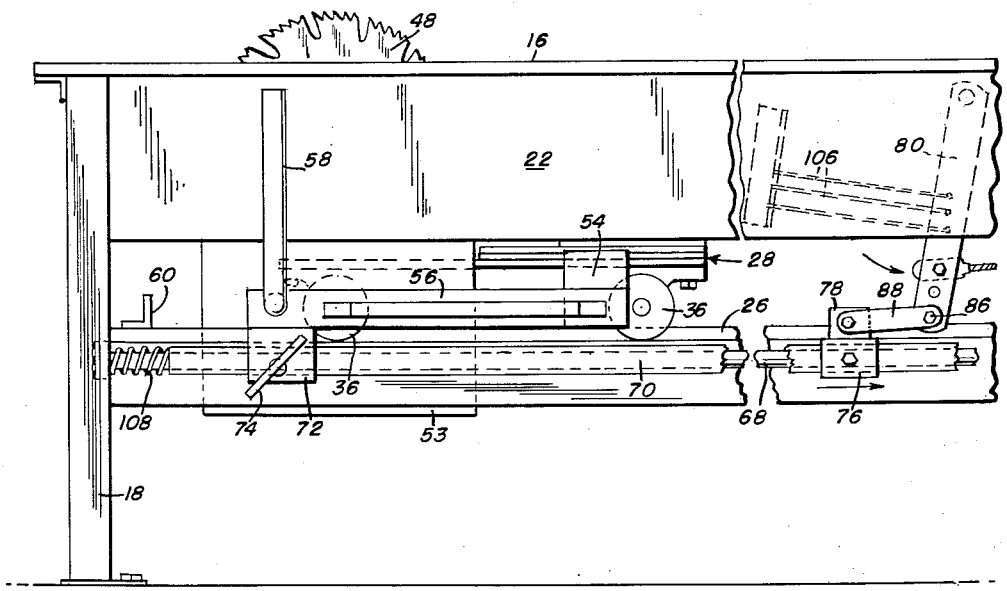
Fig. 6 is a fragmentary foreshortened elevational view from the front, partly sectional, of the left-hand section of an embodiment of the invention.

Fig. 6 shows that the means for moving the carriage of the left-hand section of the table comprises a downturned extension 54 of the base plate 30 or frame of the carriage. To it is welded a stiffened rearward extending strip 56 having at its distal end an outwardly and then upwardly extending handle 58. At the outer end of the travel of the carriage is positioned a stop 60. It comprises a bracket having an upwardly extending plate, the bracket being mounted between the two tracks 26. To the rear end of the carriage is mounted by a suitable clip an outwardly extending compression spring 62. At the outer end of travel, the spring resiliently engages the stop.

Figure 3:
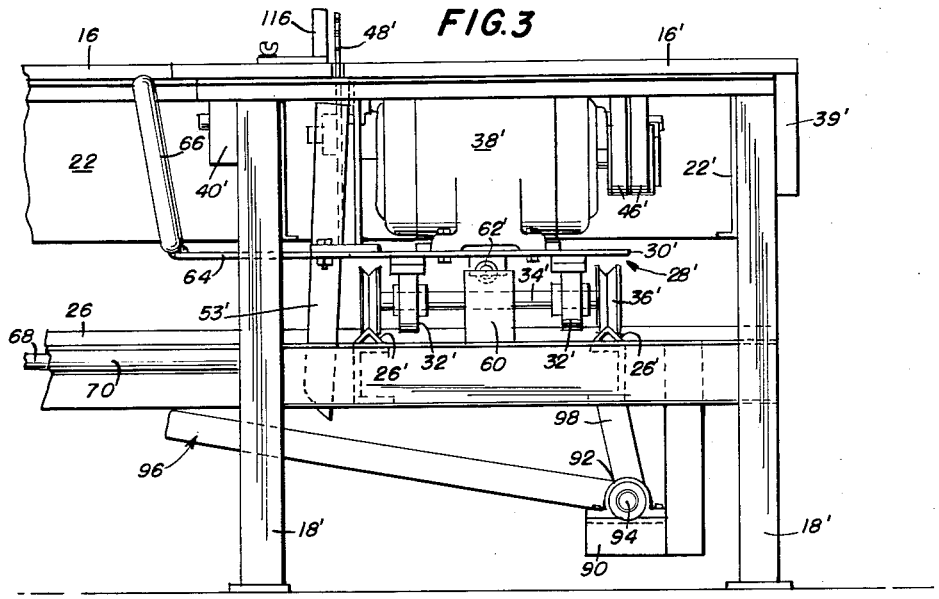
Fig. 3 is an elevational view from the right end of the right-hand section of an embodiment of the invention.

Fig. 3 indicates that the means for moving the right-hand saw unit comprises an outward extension 64 of the base plate of the carriage. Welded to the distal end of the extension may be an oval handle 66.

Since it is often of benefit to make simultaneously two cuts with the two saws of the table, it is desirable to have one of the saws foot-operable from the location adjacent the hand-operating means for the other saw. In the preferred embodiment the right-hand section of the table includes means for operating both saws. As described above, the elongated oval handle 66 provides means for moving the right-hand saw. This means for moving the left-hand saw comprises a guide rod 68 as shown in Fig. 6 running the length of the left-hand section between crossbraces 20 and disposed parallel and adjacent the rails 26. A sleeve 70 telescopes over the rod 68 and is movable therealong. To the end of the strip 56 under the handle 58 is secured a collar 72 embracing the sleeve. The collar 72 is drilled and tapped and receives a wingbolt 74 by which the position of the collar on the sleeve 70 may be fixed.

From Figs. 2, 6, and 7 it can be noted that while carriage 28 can be made to assume any place along rails 26 within limits of travel defined by stop 60 and the end of slot 24 (Fig. 6), sleeve 70 is limited in its sliding movement over rod 68 by its abutment with spring 108 and cross brace 20. Sleeve 70 is therefore, limited in movement to a distance substantially less than one-half the distance between the limits of travel of carriage 28. The reason for limiting the movement of the sleeve is that for safety's sake the unit 28 should be driven no further by the foot-operated treadle than is necessary to effect the cut. The clamp collar 72 permits adjustment of the carriage 28 so that its driven travel is in the desired zone.

Adjacent the rear of the left-hand section as shown in Fig. 7 the sleeve 70 carries a circular fitting 76 which has upstanding therefrom an apertured lug 79. Adjacent the fitting, an arm 80 is pivotally mounted by means of a bracket 82 to the side of the table. The lower end of the arm has a hole therein for receiving a pin 86 which connects link 88.

Under the right-hand section, a pair of spaced downwardly extending arms 90 mount bearings 92. A shaft 94 extends rotatably through the bearings. Extending forward from the shaft is a treadle 96. The shaft 94 extends through the bearing 92 adjacent the center of the table and carries on its outer end an upwardly extending arm 98 which moves as a unit with the treadle. The end of the arm carries a rotatable pulley 100, and a similar pulley 102 is mounted in alignment in the rear of the left-hand section as shown in Fig. 7. A flexible wire cable 104 having one end fixed to the frame of the left-hand section under the pulley 102 is trained over the pulley 100 of the arm, back around the pulley 102, and has its other end secured by a clevis to the arm 80 adjacent the link 88. A spring means 106 has one end secured to the arm and the other end secured to the frame work of the left-hand section.

Thus when the treadle 96 is pushed, motion is transmitted by means of the linkage described above, to move the saw carriage 28 rightwardly. The spring means 106 returns the saw carriage to position. When it is desired to move the left-hand saw manually, the wingbolt 74 (Fig. 6) is loosened to permit the collar 72 to ride freely on the sleeve 70. Spring means 108 around the guide rod at the outer end of the table cushion the end of the travel for the sleeve.

Fig. 8 shows that parallel and closely adjacent the saw slot 24 on either section of the table is a longitudinally extending clamp slot 110. The clamp slot is framed by parallel angle strips 112 having their horizontally disposed flanges directed toward each other. The portions of the top 16 and 16' of the sections toward the front of the table from the clamp slots are braced by angle webs 114 as shown in Fig. 9.

Riding in the slots are more or less conventional saw guards 116 and 116' (Figs. 1 and 2). Also riding in each slot is one or more cylindrical upstanding stop means 118 each having a depending reduced threaded portion 120. As shown in Fig. 9, the threaded portion extends down through an apertured plate 122 and through the clamp slot to threadedly engage an enlarged nut 124. The nut 124 may be tightened to clamp the cylinder in place by turning the cylinder 118 with the aid of a pin 126 extending through an appropriate bore. After the cylinder is clamped to the angle strips 112 at the desired position, the pin may be removed or brought flush so as not to interfere with placement of the stock against the stops as shown in phantom in Fig. 8. To assist in positioning of the cylindrical stops, a tape 128 runs along each of the clamp slots. This tape may indicate the distance from a point which would be the intersection of the two saw slots 24 and 24' were the slots extended.

As shown in Fig. 1 additional positioning means for the stock may be provided on the top of the table. This comprises an angle 130, a flange of which near one end has an aperture to receive one of the upstanding cylinder stops 118. The apertured plate 122 under the stop 118 on the opposite slot also engages the angle to fix its position. On the angle 130 is an end stop clamp 132. It is clampable to the upstanding flange anywhere therealong.

The additional positioning means are used to position the piece of stock after its opposite ends have each been cut once, to make a second cut on one end. The second cut is desired for instance in forming, for a triangular truss, a web member meeting the underside of an upper chord adjacent the peak joint. In making this second cut, the adjustable end stop clamp 132 is abutted by the end of the web member not to be cut.

Thus it can be seen that I have developed a saw table comprising two saw sections disposed at right angles. By my saw it is possible to make angled end cuts on a single piece of stock simultaneously. My device is exceptionally simple to operate and provides novel means for foot operation of one of the saw units.

While this invention has been shown in but one form, it is obvious to those skilled in the art that it is not so limited to be susceptible of various changes and modification without departing from the spirit and scope of the claimed invention.

I claim:

1. A table saw comprising a flat working surface having a slot therein, a pair of parallel, coplanar horizontal rails supported under said working surface and parallel to said slot, a carriage under said working surface, said carriage having wheels rollingly engaging said rails and said carriage being adapted to assume any place along said rails within limits of travel, a saw mounted on said carriage with blade means extending up through said slot, a guide shaft mounted under said surface parallel to said rails, a sleeve surrounding said guide shaft and slidable thereover, foot-operated means for sliding said sleeve, and a collar attached to said carriage and telescoped over said sleeve, said collar being adjustably clamped to said sleeve, means limiting the sliding movement of said sleeve to a distance substantially less than one-half the distance between the limits of travel of said carriage, whereby actuation of said foot-operated means moves said carriage to cause said blade means to move along said slot a distance no greater in length than the limited movement of said sleeve.

2. A table saw comprising a flat working surface having a slot therein, a pair of parallel, coplanar horizontal rails supported under said working surface and parallel to said slot, a carriage under said working surface, said carriage having wheels rollingly engaging said rails, and said carriage being adapted to assume any place along said rails within limits of travel, a saw mounted on said carriage with blade means extending up through said slot, a guide shaft mounted under said surface parallel to said rails, a sleeve telescoped over said guide shaft and slidable thereover, a collar surrounding said sleeve and attached to said carriage, said collar being adjustably clamped to said sleeve, treadle means mounted under said working surface, said treadle means having an upstanding arm, a linkage connecting said arm and said sleeve, means limiting the sliding movement of said sleeve to a distance substantially less than one-half the distance between the limits of travel of said carriage, whereby depression of said treadle means moves said sleeve to move said saw along said slot a distance no greater in length than the limited movement of said sleeve.

3. An L-shaped table saw having in its top surface a pair of mutually perpendicular slot means, a pair of track means situated under and parallel to said slot means respectively, first and second saw units having upstanding blade means and riding on said track means respectively, said first unit being adapted to assume any place along its track means within limits of travel, a portion of the blade means of each unit extending up through the slot means above each unit, a guide shaft mounted under said top surface adjacent and parallel the track means carrying said first unit, a sleeve surrounding said guide shaft and slidable thereover, a collar substantially less in axial dimension than said sleeve, said collar being attached to the first saw unit and loosely telescoped over said sleeve, means limiting the sliding movement of said sleeve to a distance substantially less than one-half the distance between the limits of travel of said first unit, said collar being adjustably clamped to said sleeve, control means pivotally mounted adjacent the track means carrying the second saw unit, and a linkage, said control means having said linkage operatively associated therewith, said linkage being connected to said sleeve, whereby operation of said control means moves said sleeve to advance the first saw unit along its track means a distance no greater in length than the limited movement of said sleeve, said second saw unit having manually operable moving means, whereby both of said units can be moved simultaneously to make simultaneous mutually perpendicular cuts in a workpiece stretched across said table.

4. An L-shaped table saw as described in claim 3 in which the collar has a threaded substantially radially-extending opening and a wingbolt is screwingly received into the opening to adjustably fix the position of the collar on the sleeve.

References Cited in the file of this patent

UNITED STATES PATENTS

| 701,623 | Sandstrom | June 3, 1902 |
| 1,552,340 | Paul | Sept. 1, 1925 |
| 1,756,287 | Freshwater et al. | Apr. 29, 1830 |
| 1,825,104 | Staeheli | Sept. 29, 1931 |
| 2,513,873 | Horton | July 4, 1950 |
| 2,515,008 | Humphrey | July 11, 1950 |
| 2,548,279 | Young | Apr. 10, 1951 |
| 2,599,096 | Dirksen | June 3, 1952 |
| 2,662,563 | Grove | Dec. 15, 1953 |
| 2,814,319 | Hetman et al. | Nov. 26, 1957 |

FOREIGN PATENTS

| 115,955 | Sweden | Mar. 5, 1946 |